United States Patent
Saleem

(10) Patent No.: US 9,801,024 B2
(45) Date of Patent: Oct. 24, 2017

(54) METHOD AND SYSTEM FOR MANAGING PEOPLE BY DETECTION AND TRACKING

(71) Applicant: Kashif Saleem, Perth (AU)

(72) Inventor: Kashif Saleem, Perth (AU)

( * ) Notice: Subject to any disclaimer, the term of this patent is extended or adjusted under 35 U.S.C. 154(b) by 0 days.

(21) Appl. No.: 14/802,452

(22) Filed: Jul. 17, 2015

(65) Prior Publication Data

US 2016/0080907 A1 Mar. 17, 2016

Related U.S. Application Data

(60) Provisional application No. 62/026,002, filed on Jul. 17, 2014.

(51) Int. Cl.
*H04W 24/00* (2009.01)
*H04W 4/02* (2009.01)
*H04L 29/08* (2006.01)
*H04W 4/00* (2009.01)

(52) U.S. Cl.
CPC ............ *H04W 4/028* (2013.01); *H04L 67/10* (2013.01); *H04L 67/12* (2013.01); *H04L 67/18* (2013.01); *H04L 67/22* (2013.01); *H04L 67/306* (2013.01); *H04W 4/005* (2013.01)

(58) Field of Classification Search
USPC .................................... 455/456.1; 340/573.7
See application file for complete search history.

(56) References Cited

U.S. PATENT DOCUMENTS

| | | | |
|---|---|---|---|
| 9,449,495 B1* | 9/2016 | Call | G08B 25/10 |
| 9,639,901 B2* | 5/2017 | Montoya | H04W 4/023 |
| 2009/0322540 A1* | 12/2009 | Richardson | A61B 5/0002 340/573.7 |
| 2013/0095459 A1* | 4/2013 | Tran | A61B 5/6816 434/247 |
| 2014/0180583 A1* | 6/2014 | Doherty | G06F 17/30241 701/517 |
| 2015/0304437 A1* | 10/2015 | Vaccari | G06F 1/3215 709/204 |
| 2016/0027278 A1* | 1/2016 | McIntosh | G08B 21/0423 715/741 |
| 2016/0035046 A1* | 2/2016 | Gupta | G06Q 50/01 705/7.29 |

* cited by examiner

*Primary Examiner* — David Q Nguyen
(74) *Attorney, Agent, or Firm* — Joseph Stecewycz

(57) ABSTRACT

The present invention is a system and method of managing event-based people detection and tracking, the method including: capturing attributes of an event, people, timings, location, ambience and incidents; profiling people based on the event location, event timings, event ambience, and event incidents; categorizing people based on the profiling; generating user-defined rules detection and tracking of people; providing recommendations in connection with detection and tracking of people; and tracking the efficacy of the recommendations.

6 Claims, 8 Drawing Sheets

METHOD AND SYSTEM FOR MANAGING PEOPLE BY DETECTION AND TRACKING

BACKGROUND OF THE INVENTION

Field of the Invention

The present invention generally relates to a system for detecting and tracking people, and more particularly, to managing event-based people detection and tracking using a combination of detection technologies.

Description of the Related Art

The technology to build Radio Frequency Identification (RFID) is known in the art. Likewise, the Global Positioning System (GPS) has been operational for almost more than a decade and is rapidly becoming a commodity item. For example, GPS receivers are now found in cars, phones, watches, and cheap handheld units. BLUETOOTH®-enabled GPS receivers are capable of communicating wirelessly with laptops or Personal Digital Assistants (PDAs) over short distances, without any physical connectivity. Most of the new cell phones are GPS-enabled.

Thus, in spite of the advantages of the related art, there is a need for design and implementation of an improved system and method for managing people detection and tracking.

SUMMARY OF THE INVENTION

In one aspect of the present invention a method of managing event-based people detection and tracking comprises capturing one or more attributes of at least one of an event, people, timings, location, ambience and incidents thereof, profiling people based on at least one of the location of the event, timings associated with the event, ambience in the vicinity of the event, incidents occurring in the event and at least a combination thereof, categorizing people based at least in part on the profiling, generating user-defined rules for at least one of detection and tracking of people and a combination thereof based on the categories of the people, providing recommendations in connection with at least one of detection and tracking of people and a combination thereof based on the categories of the people, and tracking the efficacy of the recommendations.

In another aspect of the present invention a method for event-based tracking of a target person by detection comprises generating and storing a historical profile of the target person based on one or more attributes of the target person and behavior of the target person as a participant in past events similar to an instant event, generating and storing historical profiles of locations traversed by the target person during the past events similar to the instant event in a venue therefor, generating and storing historical profiles of peers with whom the target person interacted during the past events similar to the instant event, generating and storing historical profiles of incidents the target person met with during the past events similar to the instant event, generating and storing historical profiles of ambient conditions the target person was exposed to during the past events similar to the instant event, detecting and capturing locations traversed by the target person during the instant event in a venue therefor, detecting and capturing peers with whom the target person interacted during the instant event, detecting and capturing incidents the target person meets with during the instant event, detecting and capturing ambient conditions the target person is exposed to during the instant event, comparing each of the detected and captured locations, peers, incidents and ambient conditions in connection with the instant event and generated and stored profile of the target person against the generated and stored profiles of the locations, peers, incidents and ambient conditions in connection with past events similar to the instant event and finding maximum matching results based on the comparison.

In still another aspect of the present invention disclose a method managing event-based people detection and tracking. The method comprises capturing one or more attributes of an instant event and past events, similar to the instant event, capturing one or more attributes of people participating in the instant event and past events, similar to the instant event, capturing one or more attributes of locations traversed by the people during the instant event and past events, similar to the instant event, capturing one or more attributes of incidents faced by the people during the instant event and past events, similar to the instant event, capturing one or more attributes of ambient conditions met by the people during the instant event and past events, similar to the instant event, generating profiles of the people based on the captured attributes, categorizing the people based on their corresponding profiles, generating user-defined rules for detecting and tracking people based on the categories, providing recommendations in connection with selection and implementation of one or more of the generated rules for detecting and tracking people and tracking the efficacy of the recommendations.

BRIEF DESCRIPTIONS OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the method and system is described herein by way of example for several embodiments and illustrative drawings, those skilled in the art will recognize that the method and system for managing people detection and tracking, is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for managing people detection and tracking defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE INVENTION

A method and system for managing people detection and tracking are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Figure 1:
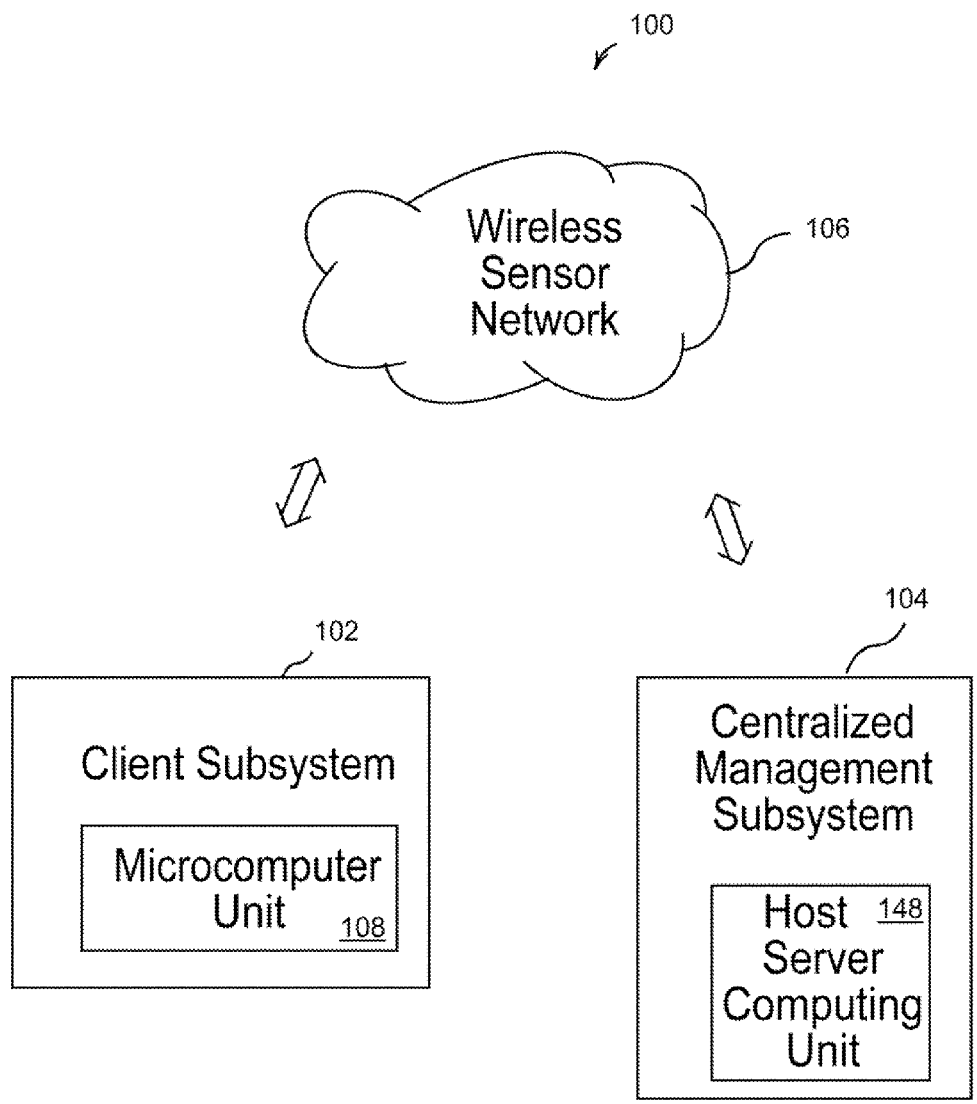
FIG. 1 is a functional block diagram illustrating a system for managing event-based people detection and tracking, the system including a client subsystem, a centralized management subsystem, and a wireless sensor network, according to an aspect of the present invention.

There is shown in FIG. 1 a system 100 for managing event-based people detection and tracking, which may include using Radio Frequency Identification (RFID) and Global Positioning System (GPS) technologies, in accordance with the present invention. The system 100 may comprise a client subsystem 102, a centralized management subsystem 104 and a wireless sensor network 106.

The system 100 functions to manage people by detection and by tracking, including: event-based people detection by tracking, and people tracking by detection. People detection may be accomplished by using motion detectors, such as, for example, passive Infrared (PIR) sensors, ultrasonic sensors, microwave sensors and Tomographic Motion Detectors. In an exemplary embodiment, the number of people may also be counted by using one or more of a tally counter, infrared beams, computer vision, thermal imaging, synthetic intelligence, and three dimensional (3D) cameras.

The system 100 further functions to capture and analyze attributes of one or more entities, such as people, events, locations, and ambience, and one or more relationships among the entities. The location of people may be obtained by using GPS receivers, or digital imaging devices, such as cameras. In addition, a network or grid of presence sensors is also used to localize people, where localization is considered a higher-resolution generalization of presence detection.

The system 100 may also function to provide recommendations for tracking the entities and parameters based on the categories and profiles of the entities. The system 100 may generate context based on the entities and the corresponding relationships among the entities.

The client subsystem 102 may be wirelessly coupled to the centralized management subsystem 104 via the wireless sensor network 106, which may function in conjunction with a LAN, a WAN, and/or the Internet, as is well-known in the art.

In an exemplary embodiment, the client subsystem 102 may comprise one or more mobile computing and communications devices that are worn or carried by a person to be tracked or monitored. For example, the client subsystem 102 may be a smart device that preferably includes a microcomputer unit 108.

An administrator of the system 100 may have access to the centralized management system 104 operated by means of a host server computer unit 148. The centralized management subsystem 104 is similarly in communication with the wireless sensor network 106. The client subsystem 102 worn or carried by the person to be tracked or monitored interacts with the wireless sensor network 106, and this interaction is thereby detected and monitored by the centralized management subsystem 104.

Operation of the system 100 can be described with reference to a flow diagram 160, shown in FIG. 2. The administrator of the system 100 may identify an event to be managed or monitored, at step 162. If the wireless sensor network 106 had not been previously installed at the venue, the wireless sensor network 106 may be emplaced at the identified event, at step 164.

A system database is accessed, at step 166, to retrieve historical data related to the identified event. The historical data may include, for example, various attributes related to past events that were similar or the same as the identified event. The event historical data may have been previously obtained.

Figure 4A:
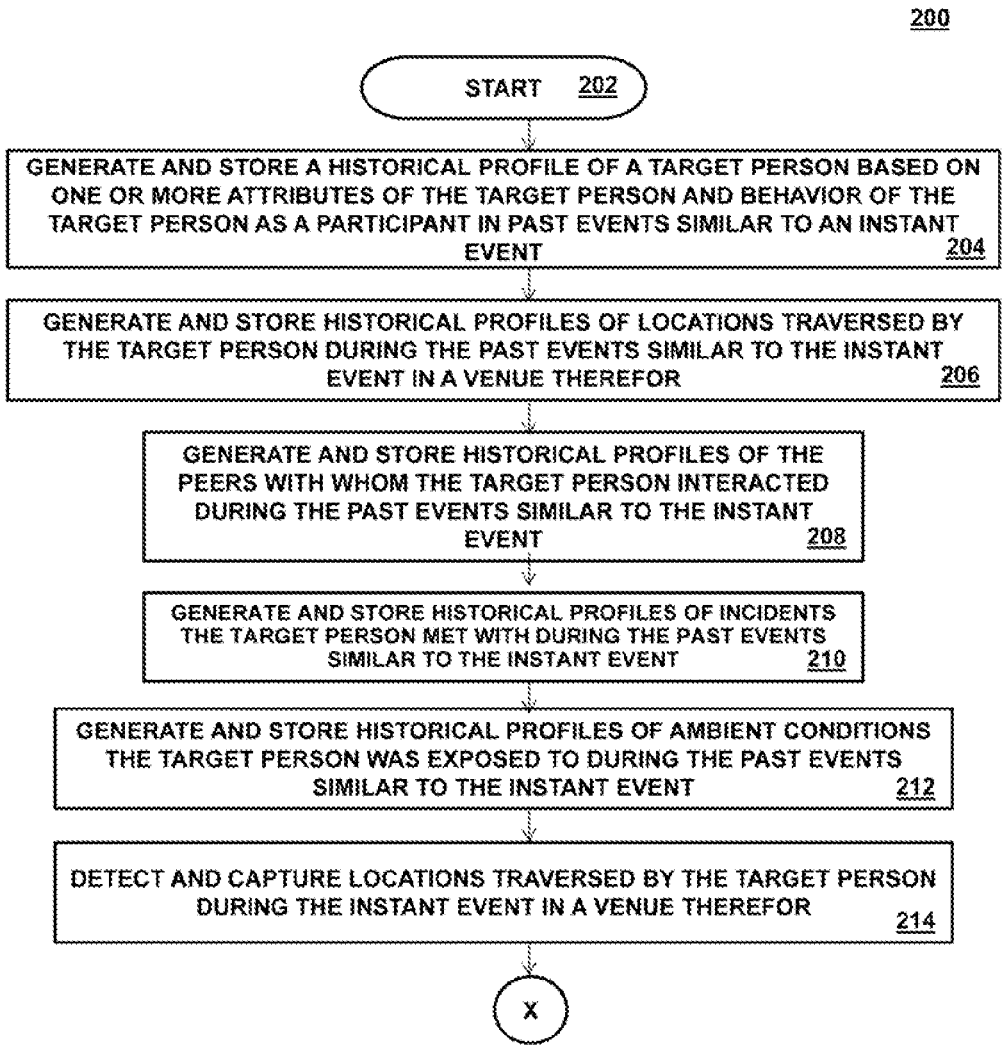
FIGS. 4A and 4B depict a flow diagram illustrating a method for using the system of FIG. 1 to manage event-based people detection and tracking.

The system database may further include historical profiles of attendees present at the past events. The attendee historical profiles may include, for example: (i) the behavior of the attendee as a participant in the historical event, (ii) the locations traversed by the attendee at the event, (iii) historical profiles of the peers with whom the attendee interacted, (iv) incidents the attendee met with at the historical events, and (v) the ambient conditions present at the event. The attendee historical data may have been previously obtained in accordance with method steps 204 through 212, described below in FIG. 4A.

A target attendee or person of interest at the event may be selected for monitoring or tracking by the administrator of the system 100, at step 168. The selected attendee may then be tracked to obtain characteristics relevant to the activities and presentations at the event. This action of tracking produces an interim profile of the target attendee, at step 170. The interim profile is compared with historical profiles of previous attendees that were obtained from the system database, at step 172. If a match is obtained, or the target attendee is identified with a high probability, at decision block 174, the system 100 may assign the identification to the target attendee, and may continue to track the target attendee, or may provide a recommendation regarding the target attendee.

If the interim profile does not match any historical profile retrieved from the system database, at decision block 174, the process returns to step 168 where a new target attendee may be selected for tracking. Alternatively, the system 100 may continue tracking of the target attendee for the purpose of adding another profile to the system database.

Figure 3:
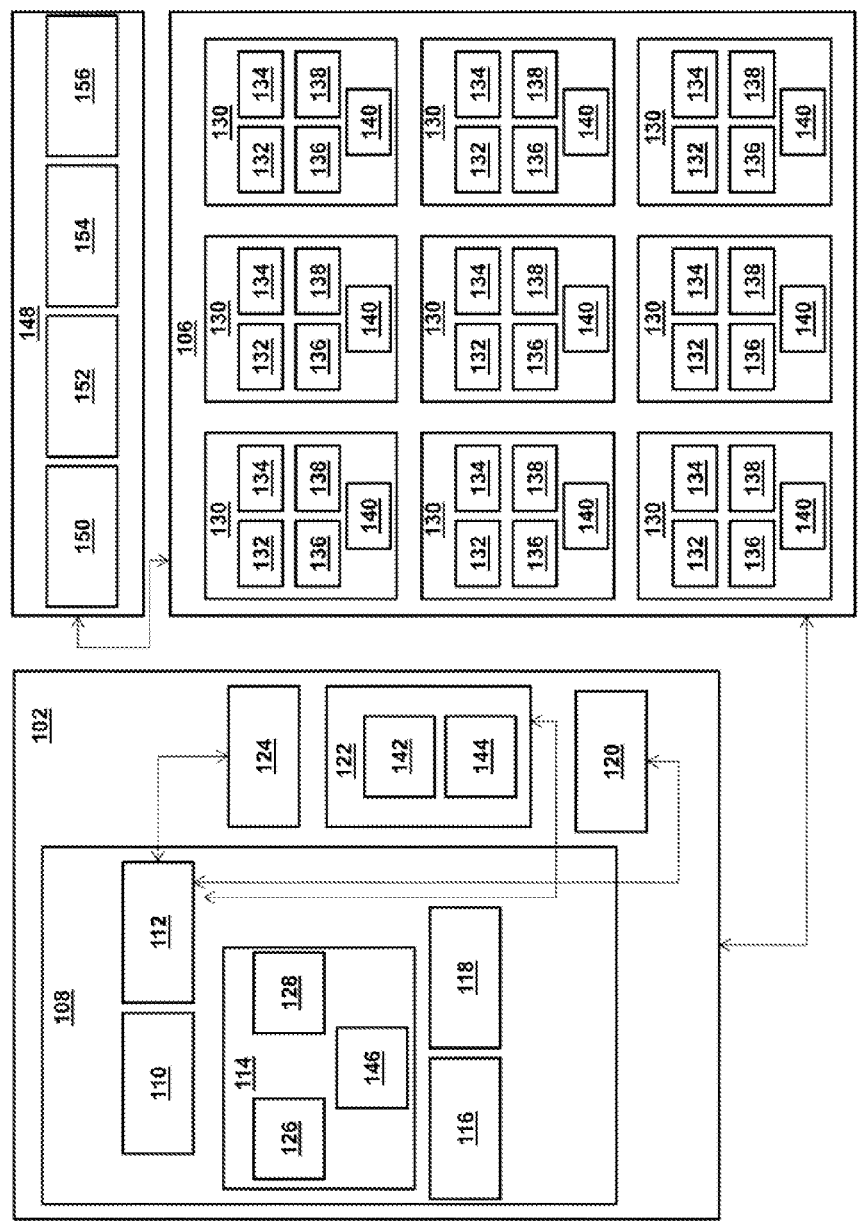
FIG. 3 is a functional block diagram showing components of the client subsystem and the centralized management subsystem of FIG. 1.

As best shown in the diagrammatical illustration of FIG. 3, the microcomputer unit 108 in the client subsystem 102 may comprise a microprocessor subunit 110, an I/O subunit 112, a memory subunit 114 and a set of support circuits 116. In an exemplary embodiment, the microcomputer unit 108 may comprise a first wireless transceiver 118 to enable communication with the wireless sensor network 106. Further, the microcomputer unit 108 may comprise a display screen (not shown), as is well-known in the relevant art.

The memory subunit 114 may comprise a portable Operating System (OS) 126, a first local device database 128, and a Database Management System (DBMS) 146. The first local device database 128 may comprise an In-Memory Database (IMDB), a Main Memory Database (MMDB)

system, a micro-database, or a similar memory resident database. The DBMS 146 may comprise a micro DBMS or a pico DBMS.

As shown in the functional diagram, the I/O subunit 112 may be coupled to one or more optional sensors 120, a Radio Frequency Identification (RFID) tag 122 and a Global Positioning System (GPS) sensor or receiver 124. The GPS sensor or receiver 124 functions to identify the person wearing or carrying the one or more optional sensors 120, and serves to determine a position or location for the person.

For example, the RFID tag 122 may comprise at least one of a passive RFID tag, an active RFD tag, and a Battery-Assisted Passive (BAP) RFID tag, based on the preferred mode of operation. In one mode of operation, the RFID tag 122 periodically transmits the ID signal. In a second mode of operation, the BAP RFID tag 122 is activated in the presence of an RFID reader or sensor. In a third mode of operation, a passive RFID tag 122, which does not operate on battery power, is illuminated with a power level roughly three (3) times in magnitude stronger than for signal transmission.

The RFID tag 122 may be at least one of a read-only tag, a read from and write to (read/write), tag, and a Write-Once-Read-Many (WORM) tag, and blank based on permissions or access rights, i.e. read and write. Specifically, the read-only RFID tag 122 comprises a factory-assigned serial number that is used as a key into a database. Alternatively, the read/write RFID tag 122 facilitates the writing of an identifiable object-specific data by a system user. Still alternatively, a field programmable tag, or WORM RFID tag 122, facilitates writing an electronic product code therein and reading therefrom by a user.

In an exemplary embodiment, the RFID tag 122 may comprise an Integrated Circuit (IC) 142 and an antenna 144. The IC 142 functions to store and process information, to modulate and demodulate a Radio-Frequency (RF) signal, and collect Direct Current (DC) power from an incident reader signal. The antenna 144 receives and transmits the RF signal. The information in the RFID tag 122 may be stored in a non-volatile memory such as, for instance, the memory subunit 114. The RFID tag 122 may comprise at least one of a chip-wired logic, a programmed data processor, and a programmable data processor, such as the microprocessor subunit 110, for processing the transmission and data of the sensors, such as the one or more optional sensors (transducers) 120 and GPS sensor or receiver 124, respectively.

In an exemplary embodiment, the wireless sensor network 106 may comprise one or more wireless sensor nodes 130 installed at one or more specified locations (or positions) in one or more areas of one or more geographic regions. Such specified locations include locations which serve as venues for events and are populated by persons, including those persons selected for detection and tracking using the system 100.

In an exemplary embodiment, the topology of the wireless sensor network 106 varies from a simple star network to an advanced multi-hop wireless mesh network. The propagation technique between the hops of the network is at least one of routing and flooding.

The wireless sensor network 106 is thus configured to provide an arrangement of spatially distributed autonomous sensors to monitor physical or environmental conditions, such as temperature, sound, pressure, etc. and to cooperatively pass sensor data through the wireless sensor network 106 to a main location. Preferably, the wireless sensor network 106 is bi-directional so as to enable remote control of wireless sensor node 130 activity. Accordingly, the wireless sensor network 106 may be configured for: (i) power consumption constrains for the wireless sensor nodes 130 using batteries or energy harvesting; (ii) ability to cope with the failures of the wireless sensor nodes 130; (iii) mobility of the wireless sensor nodes 130; (iv) communication failures; (v) heterogeneity of the wireless sensor nodes 130; (vi) scalability to large scale of deployment; (vii) ability to withstand harsh environmental conditions; and (viii) ease of use.

Standard specifications for the wireless sensor nodes 106 may include: ANT, IPv6 over Low power Wireless Personal Area Networks (6LoWPAN), DASH7, ONE-NET, ZIG-BEE®, Z-Wave, Wibree, Wireless Highway Addressable Remote Transducer Protocol (WIRELESSHART®), IEEE 802.15.4, MiWi, and the like.

Each wireless sensor node 130 preferably comprises a microcontroller 132, a second wireless transceiver 134, an external memory 136, a power source 138 and a second set of one or more pre-specified sensors 140. The microcontroller 132 performs tasks, processes data and controls the functionality of other components in the wireless sensor nodes 130. Alternative controllers are microprocessors, Digital Signal Processors (DSPs), Field-Programmable Gate Arrays (FPGAs) and Application-Specific Integrated Circuits (ASICs). However, a microcontroller is often used in many embedded systems, such as sensor nodes, because of low cost, ease of integration, ease of programming, and low power consumption of the microcontroller. The external memory 136 may comprise at least one of an on-chip memory of the microcontroller 132 or a flash memory, such as an off-chip RAM.

Often, sensor nodes use Industrial, Scientific and Medical (ISM) Radio Bands, which gives free radio, spectrum allocation and global availability. The possible choices of wireless transmission media are radio frequency (RF), optical communication (laser) and infrared. Laser devices require less energy, but need line-of-sight for communication and are sensitive to atmospheric conditions. Infrared transmitters, like lasers, need no antenna but are limited in broadcasting capacity. Radio frequency-based communication is the most relevant that fits most of the wireless sensor network applications. Wireless sensor networks tend to use license-free communication frequencies: 173, 433, 868, and 915 MHz; and 2.4 GHz.

The second wireless transceiver 134 maintains one or more distinct functional states, namely transmit, receive, idle, and sleep. In some embodiments, current generation type second wireless transceiver 134 may comprise built-in state machines that perform some operations automatically.

In some scenarios the second wireless transceiver 134 may be completely shut down, rather than left on in an idle mode, in the event that the second wireless transceiver 134 is not operating in at least one of the transmit and receive mode.

In operation, the wireless sensor node 130 consumes power for sensing, communicating and data processing. More energy is required for data communication than for any other process. For example, the energy cost of transmitting one kilobyte for a distance of 100 meters is approximately the same as that used for the execution of three million instructions by a 100 million instructions per second/W processor. Thus, power is stored in at least one of batteries and capacitors. In general, batteries, both rechargeable and non-rechargeable, are the main source of power supply for the wireless sensor node 130.

In general, there are two kinds of sensor nodes used in the wireless sensor network 106. One is the normal sensor node deployed to sense the phenomena and the other is gateway node that interfaces sensor network to the external world.

In an exemplary embodiment, each wireless sensor node 130 may comprise one of the second types of sensors 140. For example, the types of sensors 140 may include: an acoustic sensor, a sound sensor, a vibration sensor, a chemical sensor, an electric current sensor, an electric potential sensor, a magnetic sensor, a radio sensor, an environment sensor, a weather sensor, a moisture sensor, a humidity sensor, a position sensor, an angle sensor, a displacement sensor, a distance sensor, a speed sensor, an accelerometer, an optical sensor, a light sensor, an imaging sensor, a photon sensor, a pressure sensor, a thermal sensor, a heat sensor, a temperature sensor, a proximity sensor, and/or a presence sensor.

Referring to FIG. 3, the centralized management subsystem 104 may comprise one or more host server computing units 148. Each of the host server computing units 148 may comprise a processor subunit 150, a third I/O subunit 152, a third memory subunit 154, and a third set of support circuits 156. In an exemplary embodiment, the processor subunit 150 may comprise a third wireless transceiver 158. Further, each of the host server computing units 148 may comprise a screen display (not shown).

Preferably, the centralized management subsystem 104 facilitates implementation of complex event processing techniques. In general, event processing is a method of tracking and analyzing (e.g., processing) streams of information (e.g., data) about things that happen (e.g., events), and deriving conclusions. Specifically, complex event processing is event processing that combines data from multiple sources to infer events or patterns that suggest more complicated circumstances. The goal of complex event processing is to identify meaningful events, for instance opportunities or threats, and respond to the events as quickly as possible.

In activities involving organizations, one or more events may occur across the various layers of an organization such as, for example: sales leads, orders, and customer service calls. These events may include, for example, news items, text messages, social media posts, stock market feeds, traffic reports, weather reports, and other types of data. An event may also be defined as a "change of state," when a measurement exceeds a predefined threshold of time, temperature, or other value.

In an exemplary embodiment involving conceptual description of complex event processing, amidst thousands of incoming events, a given monitoring system may for instance receive the following three events from the same source: 1) church bells ringing, 2) the appearance of a man in a tuxedo with a woman in a flowing white gown, and 3) rice flying through the air. From the events listed above, the given monitoring system may infer a complex event, in this case, a wedding. Thus, complex event processing as a technique helps discover complex events by analyzing and correlating other events, for instance the ringing of the bells, the appearance of the man and woman in wedding attire and the rice flying through the air. As a general rule, complex event processing relies on a number of techniques including but not limited to, event-pattern detection, event abstraction, event filtering, event aggregation, and event transformation, modeling event hierarchies, detecting relationships, such as at least one of causality, membership and timing, between events and abstracting event-driven processes.

The centralized management subsystem 104 may facilitate performance by: (i) capturing one or more attributes of one or more entities involved in one or more events, (ii) analyzing the captured attributes, (iii) profiling the one or more entities based on the captured and analyzed attributes of the entities, and (iv) categorizing the one or more entities based on the profiles. For example, the entities may include: (i) visitors participating in the events, (ii) the locations traversed by the visitors in the venues of the events, (iii) the peers with whom the visitors interact or have interacted with during the events, (iv) the incidents the visitors are or were exposed to, (v) the visitors met with during the events, and (vi) the ambient conditions the visitors are or were exposed to during the events.

The centralized management subsystem 104 may thus facilitate providing recommendations for at least one of detecting, tracking the entities and a combination of detecting/tracking based on the categories and profiles of the entities.

In some embodiments involving event-based registration of new visitors and Authentication, Authorization and Accounting (AAA) of new and registered visitors, each new visitor being at least one individual and belonging to a group, and is subjected to an event-based new visitor registration and AAA, upon entering the premises or venue for the specific event. Specifically, each new visitor is subjected to the event-based new visitor registration by the centralized management subsystem 104. Following registration, each new visitor may be issued a wearable computing and communications device, which may be an RFID tag storing a unique RFID number.

The unique ID may possess a user-definable proprietary data structure, in accordance with the principles of the present invention. Specifically, the user-definable proprietary data structure may comprise of one or more attributes or fields in connection with one or more entities or parameters, such as the visitors, venues, events, time, and the like. More specifically, each unique ID may comprise one or more attributes of a given visitor, or a visitor type descriptive of the given visitor such as, for example, at least one of: (i) an individual and group visitor, (ii) a visitor registration type of the given visitor, such as new and registered, (iii) a distinct visitor ID of the given visitor, (iv) a distinct group ID of the given visitor, (v) a group type of the given visitor, such as at least one of family, friends and a combination of family and friends, (vi) a source and a destination location of the given visitor, (vii) the number of visitors in the group of the given visitor, (viii) the name of the given visitor, (ix) the age range of visitors in the group of the given visitor, (x) the age of the given visitor, (xi) the profession of the given visitor, (xii) the gender of the given visitor, (xiii) the date and time of at least one of new and re-registration of the given visitor, and (xiv) the number of visits the given visitor has made in the past.

A generic historical event(s) profile may be constructed for a person detected by the system 100 at a current event, the profile construction based on one or more attributes of past event(s) attended by the detected person, and for which the past event(s) have a similarity to the current event being attended. For example, the similar past event(s) may share at least one of the following attributes with the current event:

1) an actual, expected, guesstimated, and/or tentative date and time of commencement and conclusion of the past events,
2) the frequency of occurrence, such as, for example, annually, bi-annually, tri-annually, quarterly, monthly, and semi-annually,
3) the average maximum event duration,
4) the expected, guesstimated, or tentative average maximum event duration, 5) the average minimum event duration,
6) the actual, expected, guesstimated, or tentative average minimum event duration,
7) the actual, expected, guesstimated, or tentative average event venue accommodation capacity,
8) the average event venue accommodation capacity,
9) the average maximum and minimum turn-up, or presence of, event attendees,
10) the average number of individual and group attendees,
11) the average and total number of occurrences of at least one of untoward and favorable event incidents,
12) the average and total number of casualties/survivors and/or gainers/beneficiaries in the untoward and favorable incidents respectively,
13) the expected, guesstimated and/or tentative date, time, and duration of occurrences of untoward and favorable event incidents, and
14) the profile of and combinations of: (i) offenders, gainers, or beneficiaries; and (ii) defenders, victims, or losers, in at least one of the untoward and favorable event incidents.

In some embodiments, a current event profile may be constructed based on one or more event-based and related factors, including one or more of the following:
1) the total number of event visitors,
2) the number of new individual event visitors,
3) the number of new group event visitors,
4) the number of registered individual event visitors,
5) the number of registered group event visitors,
6) the total number of times, or the frequency of event participation by the registered individual visitors,
7) the total number of times, or the frequency of event participation by the registered group visitors,
8) the expected, guesstimated, or tentative, date and time of commencement and conclusion of the current event,
9) the time elapsed since the current event commenced,
10) the age range of the event visitors,
11) the average age of the event visitors,
12) the gender of the majority and/or the minority of event visitors,
13) the average age of the majority and/or minority of event visitors,
14) the ambient conditions in the venue of the current event, including: (i) the level of noise, (ii) the intensity of ambient light, (iii) the level of ambient humidity, (iv) the level of carbon dioxide ($CO_2$), carbon monoxide (CO) and other hazardous and safe gases in the air, (v) the level of moisture in the air, (vi) the temperature of the air, and (vii) a combination of ambient conditions (i) through (vi),
15) the number of electronic communications, such as emails, SMSs and calls, made by event visitors,
16) the number of interactions between a first specified visitor and a second specified visitor, where the interaction may be a one-to-one interaction or a one-to-many interaction,
17) the root causes and effects of occurrences of untoward event incidents and favorable event incidents, and
18) the frequency of occurrence of a specified untoward event incident or of a favorable event incident.

The system 100 may generate a current event-independent static profile of a new visitor, at least one of (i) individual and (ii) belonging to a group based on one or more native (or inherent or independent) profiles of the new visitor. For example, the native profiles of the new visitor may comprise at least one of personal, behavioral (or activity), historical, biological, physiological, psychological profile and a combination therefor of the new visitor. The physiological, psychological attributes may comprise one or more of the age, gender, date of birth (DOB), name of the new visitor, at least one of a father's, mother's and guardian's name, a Personally Identifiable Information (PII) attribute, the height, weight, address, telephone number, email, mobile number, facsimile, blood group, allergy information, diseases information, color, religion, nationality or citizenship, biometric information, profession, qualification, salary, credit card information, driving license, tax information, background information, credit score, martial information, spouse information, and family information.

The system 100 may generate an event-dependent or event-based static profile of a target registered visitor based on: (i) the one or more native, inherent, or independent profiles of the target registered visitor who participated in past events; (ii) the locations traversed by the target registered visitor during past events; (iii) the peers with whom the target registered visitor during past events; (iv) the incidents the target registered visitor met with or was exposed to during the past events; and (v) the ambient conditions the target registered visitor was exposed to during the past events.

The system 100 functions to track people by detection. The system 100 may take into consideration one or more entities or factors involved in an event attended by a person to be tracked. For example, the system 100 may consider, for a target person participating in an event, (i) one or more locations the target person traverses, (ii) one or more peers with whom the target person interacts, (iii) one or more incidents the target person meets with or to which the target person is exposed; and (iv) one or more ambient conditions to which the target person is exposed.

The system 100 further functions to construct a static profile of one or more entities or factors. For example, the system 100 may generate a static profile based on: (i) historical behaviors or activities of the target person as an event participant, (ii) the locations traversed by the target person during past events, (iii) the peers with whom the target person interacted during past events, (iv) incidents the target person faced, met with, or was exposed to during past events, and (v) ambient conditions the target person was exposed to during past events. The system 100 facilitates overall management, such as storage and processing, of the generated static profiles.

The system 100 may categorize the target persons, the locations, the peers, the incidents and the ambient conditions based on the correspondingly generated static profiles.

In use, the system 100 facilitates event-based tracking of the target person based on detection. Specifically, the system facilitates detecting the target person based on: (i) the generated static profile of the target person, (ii) detecting the locations traversed by the target person based on the generated static profiles of the locations, (iii) detecting the peers with whom the target person interacts during the event based on the generated static profiles of the peers, (iii) detecting the incidents the target person meets with or is exposed to during the event based on the generated static profiles of the incidents and (iv) detecting the ambient conditions the target person is exposed to during the event based on the generated static profiles of the ambient conditions.

In the event that a new event incident occurs, the system 100 captures the new incident and detects the new incident based on a comparative analysis between the new incident and the generated static profiles and corresponding categories of such and similar incidents that occurred in the past events.

The system may track people so as to facilitate people detection. The system 100 may take into consideration one or more entities or factors involved in the event. The system may consider: (i) a target person participating in an event, (ii) one or more locations the target person traverses during the event, (iii) one or more peers with whom the target person interacts during the event, (iv) one or more incidents the target person meets with or is exposed to during the event, and (v) one or more ambient conditions the target person is exposed to during the event. The system 100 may facilitate tracking changes with respect to time in the behaviour or activities of the target person during the event.

The centralized management subsystem 104 may be capable of facilitating management of one or more use case scenarios involving security violations.

In some use case scenarios, a person or visitor may disengage, tamper or destroy and dispose the client subsystem 102. As a consequence, both the RFID tag 122 and the sensors 120 of the client subsystem 102 fail to respond to external input signals. Requests or challenges to the disengaged, tampered, and disposed client subsystem 102 from one or more wireless sensor nodes 130, in the proximity or vicinity of the wearable computing device 102, are thus not acknowledged. For example, at least one of the sensors 120 may be an infrared thermometer. The wireless sensor nodes 130 transmit the information to the centralized management subsystem 104. The centralized management subsystem 104 may record the no response of the client subsystem 102 up to a certain period of time, but with a change in the previously sensed body temperature.

The infrared thermometer 120 of the client subsystem 102 captures the change in body temperature of a person upon at least one of: (i) engagement, (ii) disengagement, and (iii) re-engagement of the wearable tag 102 to and from the body. Specifically, upon disengagement by a person (or visitor), the infrared thermometer 120 of the client subsystem 102 captures the change in the previously sensed body temperature of a person. As a consequence, both the RFID tag 122 and the sensor 120 of the client subsystem 102 attain a power off operation mode after a predefined delay. Further, both the RFID tag 122 and the sensor 120 of the client subsystem 102 stop responding to signals, requests or challenges from one or more wireless sensor nodes 130 in the proximity or vicinity of the wearable computing device 102. The wireless sensor nodes 130 transmit the information to the centralized management subsystem 104.

Upon completion of the predefined delay, both the RFID tag 122 and the sensor 120 of the client subsystem 102 attain a power-on operation mode. The wireless sensor nodes 130 transmit the information to the centralized management subsystem 104.

Upon at least one of engagement and re-engagement, both the RFID tag 122 and the sensor 120 of the client subsystem 102 initially maintain a power off operation mode. An infrared thermometer 120 coupled to the wearable computing device 102 captures the change in body temperature of a person (or visitor) upon at least one of engagement and disengagement of the wearable computing device 102 to the body of the person after a certain time delay.

In some embodiments, the client subsystem 102 demands or requests a user to input the biometric information of the person wearing the client subsystem 102. The biometric information of the person is matched and authenticated against the biometric profile or information of the person stored at least one of locally in the client subsystem 102 memory and remotely by the centralized management subsystem 104. Upon successful authentication and attainment of the average body temperature of the person, both the RFID tag 122 and the sensor 120 of the client subsystem 102 attain a power on operation mode.

In some embodiments, the system may be ambient intelligent. In computing, Ambient Intelligence (AmI) refers to electronic environments that are sensitive and responsive to the presence of people.

The centralized management subsystem 104 at a given geographic site or location may function to manage an event crowd by computing one or more quantitative parameters of interest, such as: (a) persistent change in velocity of people with the RFID tags 122 and GPS receivers 124 in a confined area, where (b) latitude and longitude (or position) in a fixed range clearly indicates that people are confined and stuck in the confined area, and (c) it appears that there is a commotion in the confined area.

In an open stadium or amphitheatre, Over-the-Head (OTH) live video ingest cameras (e.g., live feed), movable using chain and pulley, may be uploaded with the data in the RFID tag 122 and GPS receiver 124. The system 100 may, accordingly, instruct the OTH to move to a destination location in case of an event on the field so as to capture the events occurring frequently, such as, for example, people moving towards and opposite to each other, or a crowd action.

Figure 4B:
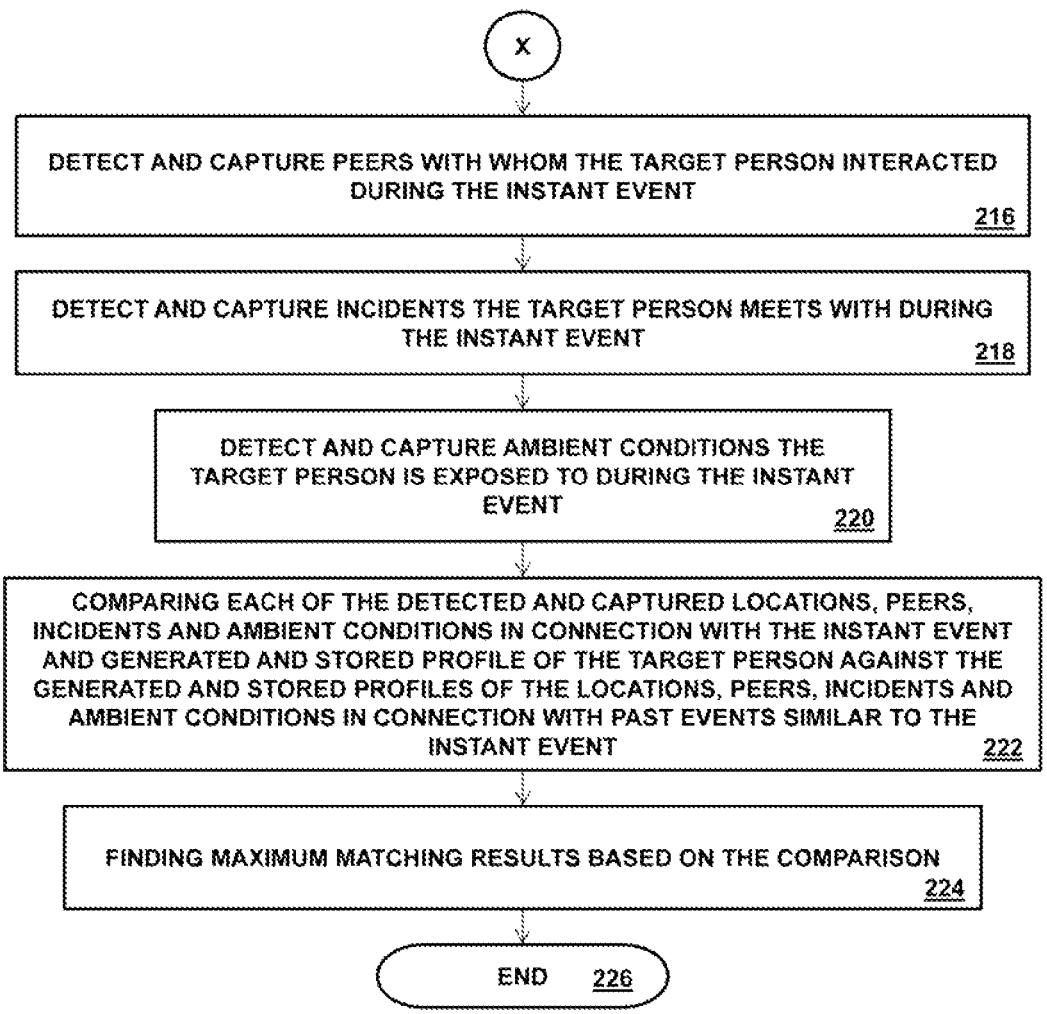

FIG. 4 depicts a method for managing event-based people detection and tracking, according to one to more embodiments. The method 200 starts at step 202 and proceeds to step 204.

At step 204, the method 200 facilitates capturing one or more attributes of an event, the people participating in the event, one or more locations traversed by the people during the event in the venue therefor, ambience in the vicinity of each of the one or more locations, and incidents occurring in each of the one or more locations thereof.

At step 206, the method 200 facilitates generating profiles of the people based on the captured attributes. At step 208, the method 200 facilitates categorizing the people based on their corresponding profiles.

At step 210, the method 200 facilitates generating user-defined rules for detecting and tracking people based on the categories. At step 212, the method 200 facilitates providing recommendations in connection with selection and implementation of one or more of the generated rules for detecting and tracking people.

At step 214, the method 200 facilitates tracking the efficacy of the recommendations. At step 216, the method 200 detects and captures peers with whom the target person interacted at the present time. At step 218, the method 200 detects and captures incidents the target person meets with. At step 220, the method 200 detects and captures the ambient conditions to which the target person is being exposed.

Each of the detected and captured locations, peers, incidents, and ambient conditions in connection with the present event and generated and stored profiles of the target person is compared against the generated and stored profiles of the locations, peers, incidents, and ambient conditions in connection with past events similar to the present event, at step 222. Maximum matching results, based on the comparison performed in step 222, are identified in step 224. The method 200 then proceeds to step 226 and ends.

Figure 5:
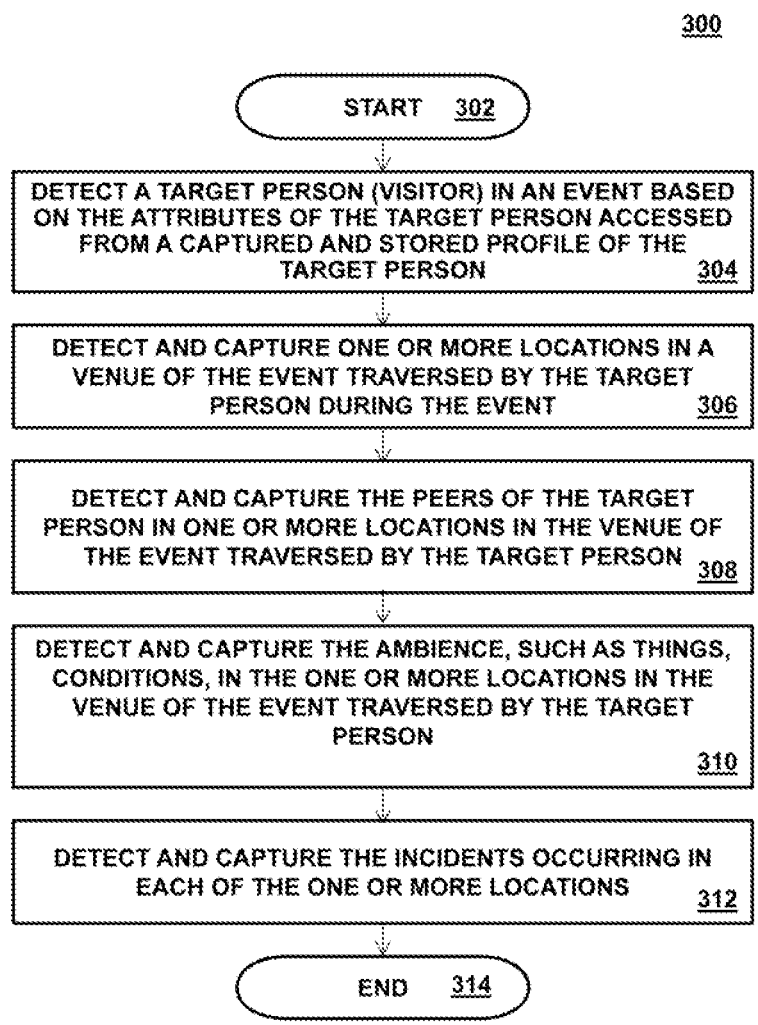
FIG. 5 depicts a flow diagram illustrating a method for using the system of FIG. 1 to detect and track people.

FIG. 5 depicts a method 300 for people detection and tracking based on people tracking by detection, according to one or more embodiments. The method 300 starts at step 302 and proceeds to step 304. At step 304, the method 300 facilitates detecting a target person (visitor) in the event based on the attributes of the target person accessed from the captured and stored profile of the target person.

At step 306, the method 300 facilitates detecting and capturing the one or more locations in the venue of the event traversed by the target person during the event. At step 308, the method 300 facilitates detecting and capturing the peers of the target person in the one or more locations in the venue of the event traversed by the target person, wherein the peers are the persons with whom the target person interacts during the event.

At step 310, the method 300 facilitates detecting and capturing the ambience, such as things, conditions, in the one or more locations in the venue of the event traversed by the target person. At step 312, the method 300 detecting and capturing the incidents occurring in each of the one or more locations. The method 300 proceeds to step 314 and ends.

Figure 6:
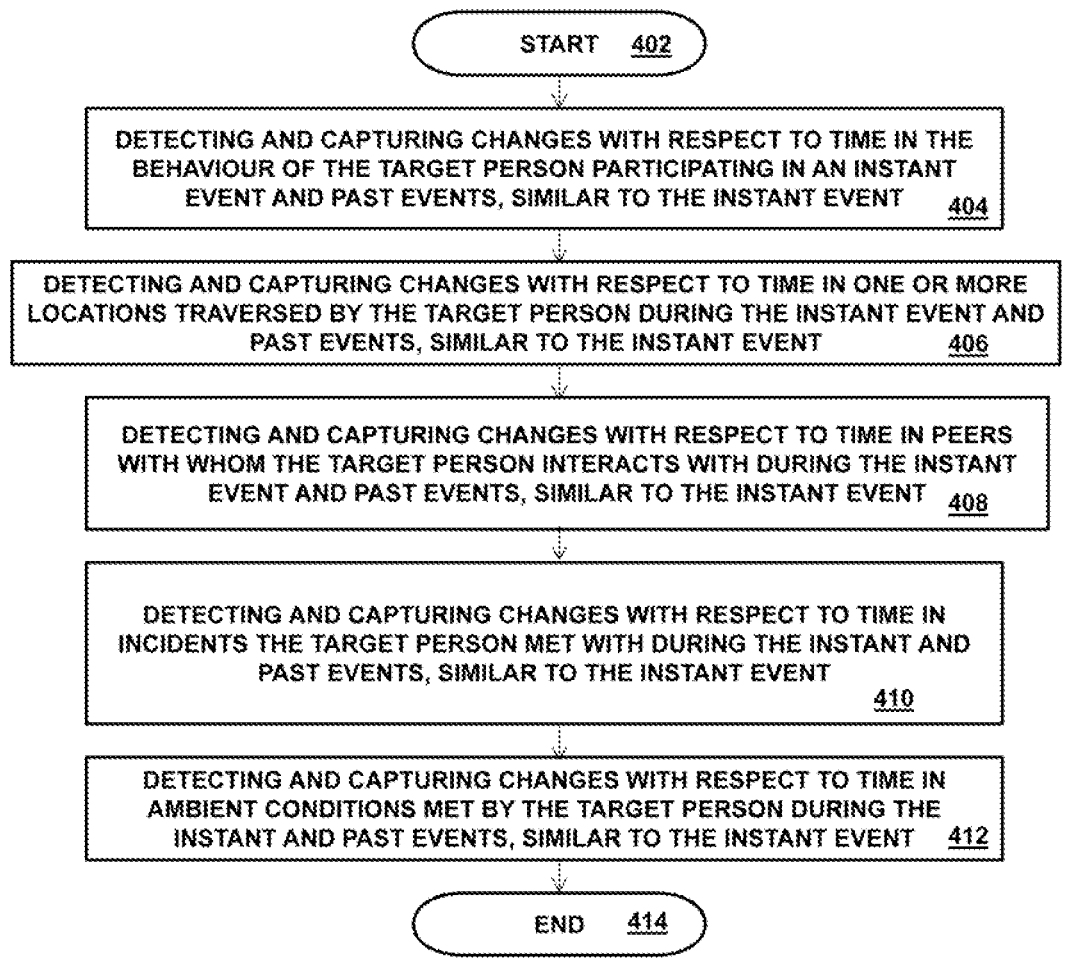
FIG. 6 depicts a flow diagram illustrating a method for detecting a target person by tracking.

FIG. 6 depicts a method 400 for detecting a target person by tracking, according to one or more embodiments. The method 400 starts at step 402 and proceeds to step 404. At step 404, the method 400 facilitates detecting and capturing changes with respect to time in the behaviour of the target person participating in an instant event and past events, similar to the current event.

At step 406, the method 400 facilitates detecting and capturing changes with respect to time in one or more locations traversed by the target person during the instant event and past events, similar to the current event. At step 408, the method 400 facilitates detecting and capturing changes with respect to time in peers with whom the target person interacts with during the current event and past events, similar to the current event.

At step 410, the method 400 facilitates detecting and capturing changes with respect to time in incidents the target person met with during the current and past events, similar to the current event. At step 410, the method 400 facilitates detecting and capturing changes with respect to time in ambient conditions met by the target person during the current and past events, similar to the current event. The method 400 proceeds to step 412 and ends.

In some embodiments, the system for managing people detection and tracking may be capable of facilitating implementation of one or more positioning technologies in accordance with the principles of the present invention. Specifically, the system may comprise positioning systems capable of using the one or more positioning technologies thereby facilitating determination of the position and orientation of at least one of entities, people confined in at least of a room, building and the world.

For example, and in no way limiting the scope of the invention, the positioning systems may be at least one of Time of Flight (TOF) systems, spatial scan systems, inertial sensing systems, mechanical linkage systems, phase difference systems, direct field sensing systems and hybrod systems. More specifically, TOF systems determine the distance by measuring the time of propagation of pulsed signals between a transmitter and receiver.

In the event that the distances of at least three locations are known, a fourth position may be determined using trilateration. Further, optical trackers, such as laser ranging trackers, suffer from line-of-sight requirements, thus the performance of the laser ranging trackers is adversely affected by ambient light and infrared radiation. However, on the other hand, the laser ranging trackers do not suffer from distortion effects in the presence of metals and may have high update rates because of the speed of light. Still further, ultrasonic trackers have a more limited range because of the loss of energy with the distance traveled. In addition, the ultrasonic trackers are sensitive to ultrasonic ambient noise and have a low update rate. However, the main advantage is that the ultrasonic trackers do not need line-of-sight. Systems using radio waves, such as the Global Navigation Satellite System (GNSS), do not suffer ambient light, but still need line-of-sight.

In some scenarios, a spatial scan based positioning system may be deployed for determination of position, in accordance with the principles of the present invention. Specifically, the spatial scan system may use (optical) beacons and sensors. In general, there are two categories of spatial scan systems, namely inside-out systems, and outside-in systems. More specifically, in case of inside-out systems the beacon is placed at a fixed position in the environment, whereas the sensor is on the object. Conversely, in case of outside-in systems the beacons are on the target and the sensors are at a fixed position in the environment. By aiming the sensor at the beacon the angle therebetween may be measured. With triangulation the position of the object is determined.

In some scenarios, an inertial sensing based positioning system may be deployed for determination of position, in accordance with the principles of the present invention. Specifically, the main advantage of the inertial sensing system is that there is no requirement of an external reference. Instead, the inertial sensing system measures at least one of the rotation with a gyroscope and the position with an accelerometer with respect to a known starting position and orientation. Because the inertial sensing systems measure relative positions instead of absolute positions, the inertial sensing systems may suffer from accumulated errors, and therefore are subject to drift. A periodic re-calibration of the system may provide more accuracy.

In some scenarios, a phase difference based positioning system may be deployed for determination of position, in accordance with the principles of the present invention. The phase difference systems measure the shift in phase of an incoming signal from an emitter on a moving target compared to the phase of an incoming signal from a reference emitter. Thus, the relative motion of the emitter with respect to the receiver may be calculated. Like inertial sensing systems, the phase-difference systems may suffer from accumulated errors, and are therefore subject to drift, but because the phase may be measured continuously the phase-difference systems are able to generate high data rates.

In some scenarios, a direct field sensing system based positioning system may be deployed for determination of position, in accordance with the principles of the present invention. The direct field sensing systems use a known field to derive orientation or position, for instance a simple compass uses the earth's magnetic field to know the orientation of the simple compass in two directions and an inclinometer uses the earth's gravitational field to determine the orientation of the inclinometer in the remaining third direction. The field used for positioning does not need to originate from nature, however. A system of three electromagnets placed perpendicular to each other can define a spatial reference. On the receiver, three sensors measure the components of the field's flux received as a consequence of magnetic coupling. Based on these measures, the system determines the position and orientation of the receiver with respect to the emitters' reference.

In some embodiment, the system may be capable of facilitating deployment of a Real-Time Locating Systems (RTLS) thereby facilitating automatic identification and tracking of the location of entities (or objects) or people in real time. Specifically, wireless RTLS tags are attached to objects or worn by people, and in most RTLS, fixed reference points receive wireless signals from tags to determine their location. Examples of RTLSs include tracking automobiles through an assembly line, locating pallets of merchandise in a warehouse, or finding medical equipment in a hospital. There is a wide variety of system concepts and designs to provide real-time locating. For example, Active Radio Frequency Identification (Active RFID), Active RFID, infrared hybrid (Active RFID-IR), Infrared (IR), Optical locating, low-frequency signpost identification, semi-active RFID, passive RFID RTLS locating via Steerable Phased Array Antennae, radio beacon, Ultrasound Identification (US-ID), Ultrasonic ranging (US-RTLS), Ultra-Wideband (UWB), wide-over-narrow band, Wireless Local Area Network (WLAN, Wi-Fi), BLUETOOTH, clustering in noisy ambience, and bivalent systems.

In some embodiments, the system may be capable of facilitating implementation of wireless locating technologies to determine the actual location of an entity by means of wireless transmission. Specifically, the wireless locating concept arises from location awareness, some generalized demand for definitive knowledge about the actual location of objects and persons. Several groups of approaches are currently manifest in products for local purposes in relative coordinates or in site-wise defined systems of coordinates. For example, choke point indexing, as with RFID tags or Organization of the Petroleum Exporting Countries (OPEC) Fund for International Development (OFID) labels; fuzzy locating, as with Wireless LAN (WLAN) or Bluetooth®, real-time locating, as with multilateration or unilateration.

In some embodiments, the system may be capable of facilitating implementation of Quantum Positioning Systems (QPSs) for determining positions of entities, in accordance with the principles of the present invention. Specifically, the QPS is proposed provides a user with all four of his space-time coordinates. The user must carry a corner cube reflector, a good clock, and have a two-way classical channel of communication with the origin of the reference frame. Four pairs of entangled photons (biphotons) are sent through four interferometers: three interferometers are used to determine the user's spatial position, and an additional interferometer is used to synchronize the user's clock to coordinate time in the reference frame.

The spatial positioning part of the QPS is similar to a classical time-of-arrival (TOA) system. However, a classical TOA system, such as GPS, must have synchronized clocks that keep coordinate time and, therefore, the clocks must have long-term stability, whereas in the QPS only a photon coincidence counter is needed and the clocks need only have short-term stability. Several scenarios are considered for a QPS: one is a terrestrial system and another is a space-based system composed of low-Earth orbit (LEO) satellites. Calculations indicate that for a space-based system, neglecting atmospheric effects, a position accuracy below the 1 cm level is possible for much of the region near the Earth. The QPS may be used as a primary system to define a global four-dimensional reference frame.

In an exemplary embodiment, the system 100 may implement a method for event-based people detection and tracking based, where the method is based on people detection by tracking. The system 100 and the method may take into consideration one of more factors directly and indirectly associated with a target person as participant in the current event and in past events that are similar to the current event.

Specifically, the one or more factors directly and indirectly associated with the target person may be: 1) the locations or positions traversed by the target person during the events, 2) the peers the target person interacted with during the events, 3) the ambience (or ambient conditions) the target person is and was exposed to, or meets or met with, during the events, and 4) the incidents the target person is and was exposed to, or meets or met with, during the events, and changes in each of the above factors 1), 2), 3), and 4) relative to time in the current event. The disclosed method for people detection by tracking may also comprise detecting and capturing changes with respect to time in the behaviour and activities of the target person as participant in the current event and in the past events.

The method for event-based people detection based on tracking may function by identifying and selecting at least one target group of persons as participants in the current event and in one or more past events, subject to detection by tracking. For clarity of explanation, the selected target group of persons is hereinafter referred to as "targeted group".

The method may further judiciously and selectively identify a target person as participant in the current event and in past events, and belonging to the targeted group for purposes of detection by tracking. The method may take into consideration one of more factors directly and indirectly associated with a target person participating in the events.

Specifically, the method may classify the factors directly and indirectly associated with the target person into following sub-factors: 1) based on at least one of an inherent, a native, historical and current behavioral, activity profile of the target person and a combination thereof partially dependent on one or more actions performed by the target person in the events; and 2) based on a historical and current exposure profile and responses of the target person to one or more incidents and ambient conditions the target person is, and was exposed or subjected to, or meets, or met with, in the events.

The method may detect and capture changes with respect to time in the behaviour or response or activity of the target person in the events. The method may detect and capture changes with respect to time in one or more locations traversed by the target person during the events. The method detects and captures changes with respect to time in the peers with whom the target person interacts with during the events. The method facilitates detecting and capturing changes with respect to time in the incidents the target person meets and met with during the events. The method detects and captures changes with respect to time in the ambient conditions the target person is and was exposed to during the events.

The one or more factors directly and indirectly associated with at least one of actions, responses, behaviour and a combination thereof of the target person may be at least one of:
1) the locations or positions traversed by the target person during the events,
2) the peers with whom the target person interacted during the events,
3) the ambience (or ambient conditions) the target person is and was exposed to, or encounters, during the events,
4) the incidents the target person is and was exposed to, or meets or met with, during the events, and a combination thereof.

For example, and in no way limiting the scope of the invention, in an exemplary embodiment, the one or more factors directly and indirectly associated with the target person may be selected from a sequence of one or more combinations comprising the one or more factors generated using a first 4-Bit, Mod-16, Step 1 sequence of distinct binary combinations. Table 1 depicts a tabular representation of the first 4-Bit, Mod-16, Step 1 sequence of distinct binary combinations comprising the one or more factors.

TABLE 1

4-BIT, MOD-16, STEP 1 SEQUENCE OF DISTINCT BINARY COMBINATIONS COMPRISING THE ONE OR MORE FACTORS

| LOCA-TION(S) | PEER(S) | AMBIENCE (AMBIENT CONDITIOSN) | INCIDENT(S) |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

In an exemplary embodiment, the method may facilitate tracking changes in each of the above factors 1), 2), 3) and 4), relative to time in the current event.

For example, and in no way limiting the scope of the invention, the changes relative to time in each of the one or more factors directly and indirectly associated with the target person may be selected from a sequence of one or more combinations comprising the changes relative to time in each of the one or more factors generated using a second 4-Bit, Mod-16, Step 1 sequence of distinct binary combinations. Table 2 depicts a tabular representation of the second 4-Bit, Mod-16, Step 1 sequence of distinct binary combinations comprising the changes relative to time in each of the one or more factors.

TABLE 2

4-BIT, MOD-16, STEP 1 SEQUENCE OF DISTINCT BINARY COMBINATIONS COMPRISING THE CHANGES IN EACH OF THE ONE OR MORE FACTORS

| CHANGES IN LOCATION(S) | CHANGES IN PEER(S) | CHANGES IN AMBIENCE (AMBIENT CONDITIOSN) | CHANGES IN INCIDENT(S) |
|---|---|---|---|
| 0 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

For instance, as per Table 2, in the event of selection of the combination "0110" based on the context of the current event, implies that the target person, and his/her at least one of actions, responses, activities and a combination thereof, under tracking exhibits changes in the peers with whom the target person interacts and the ambient conditions to which the target person is exposed to.

For instance, the change in ambient conditions may be at least one of change in ambient noise, ambient temperature, ambient humidity, ambient moisture, ambient light, ambient air quality, and the like. Likewise, in the event of selection of the combination "1111" based on the current context of the instant event, implies that the target person, and his/her at least one of actions, responses, activities and a combination thereof, under tracking exhibits changes in the locations of presence and traversal of the target person, the peers with whom the target person interacts, the ambient conditions to which the target person is exposed to and the incidents the target person meets with or is exposed to.

For instance, the target person may be at least one of moving and present a given position, wherein the target person interacts with at least one new peer, and wherein the ambient conditions to which the target person is exposed to changes, and wherein the target person meets with at least one of an untoward incident and accident and the like.

The method may comprise the step of identifying and selecting the current event to be monitored.

The step of identifying and selecting the current event to be monitored may further comprise the step of searching one or more stored profiles of past events based on at least one of an explicit user-defined and implicit predefined criteria comprising one or more attributes of the current event and one or more past events.

The step of searching the stored profiles of the past events may further comprise the step of accessing each of the stored profiles of past events and comparing each of the stored profiles of the past events against at least one of the explicit user-defined and implicit predefined criteria.

For example, in some scenarios, in the event that at least one closest relevant match is found as a result of the comparison; implies that the current event is successfully identified, and is thus selected.

Upon successful matching, the at least one closest relevant matching event profile is retrieved for purposes of reference and further use.

Specifically, the historical data for the at least one closest relevant matching event and historical profiles for attendees thereof is retrieved.

The method may further facilitate judiciously and selectively identifying a target person as participant in the current event (or event to be monitored), and belonging to the targeted group for purposes of detection by tracking.

The method may further facilitate tracking the selectively identified target person based on the event-based people detection and tracking using people detection by tracking concept disclosed above to obtain current attendee relevant characteristic profile. The method may further comprise comparing the current attendee relevant profile to attendee historical profiles.

Figure 7:
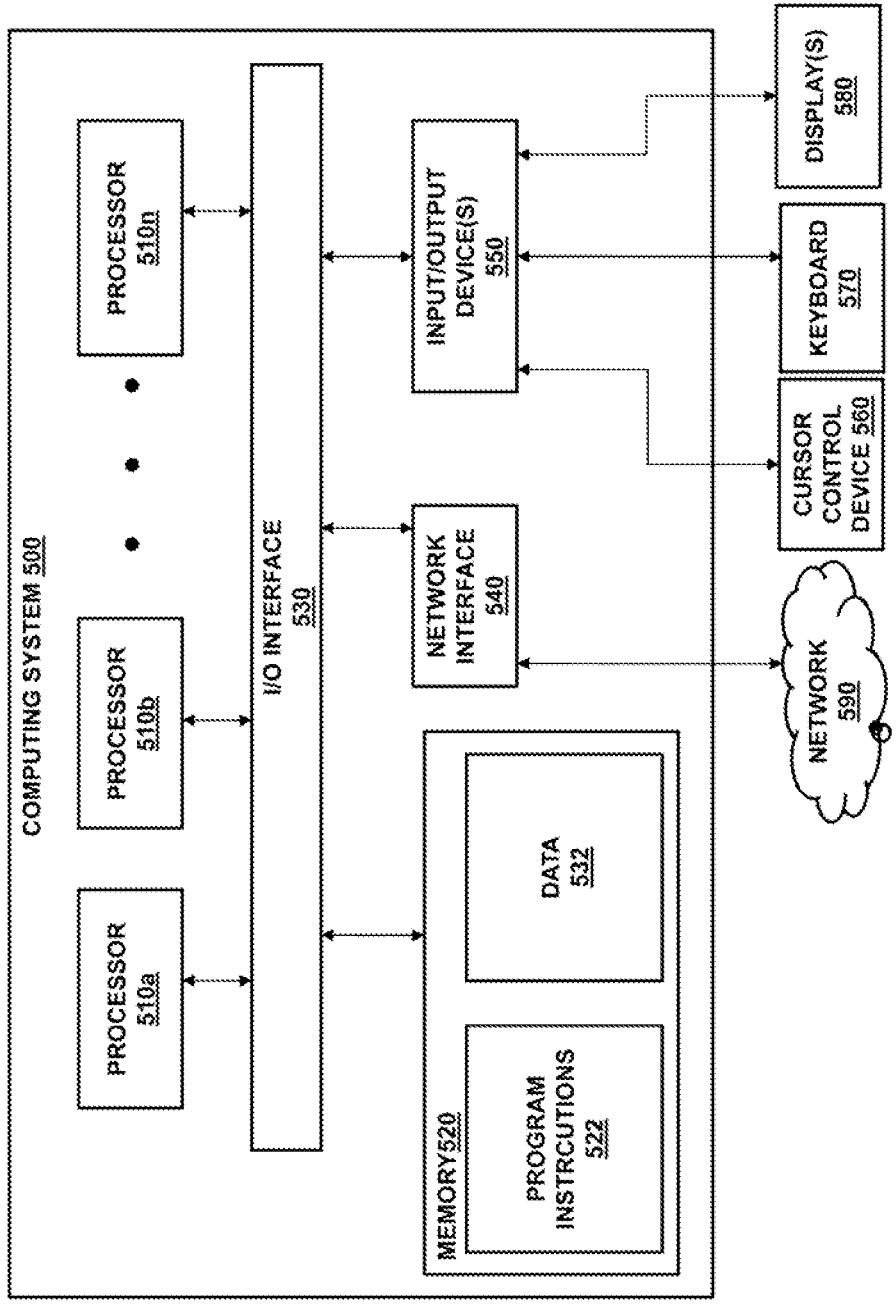
FIG. 7 depicts a functional block diagram of a computing system configured to implement one or more of the methods illustrated in FIGS. 3-5.

FIG. 7 depicts a computer system 500 that is a computing device and can be utilized in various embodiments of the present invention, according to one or more embodiments. Various embodiments of method and system for managing people detection and tracking, as described herein, may be executed on the computer system 500, which may in various embodiments implement any of the elements or functionality illustrated in FIGS. 1-6. In various embodiments, computer system 500 may be configured to implement one or more methods described above. The computer system 500 may be used to implement any other system, device, element, functionality or method of the above-described embodiments. In the illustrated embodiments, computer system 500 may be configured to implement one or more methods as processor-executable executable program instructions 522 (e.g., program instructions executable by processor(s) 510*a-n*) in various embodiments.

In the illustrated embodiment, computer system 500 includes one or more processors 510*a-n* coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of components may be utilized by the system to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 210*a-n* may be any suitable processor capable of executing instructions. For example, in various embodiments processors 510 may be general-purpose or embedded processors implementing any of a variety of instruction set architectures (ISAs), such as the x96, POWERPC®, SPARC®, or MIPS® ISAs, or any other suitable ISA. In multiprocessor systems, each of processors 510*a-n* may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Figure 2:
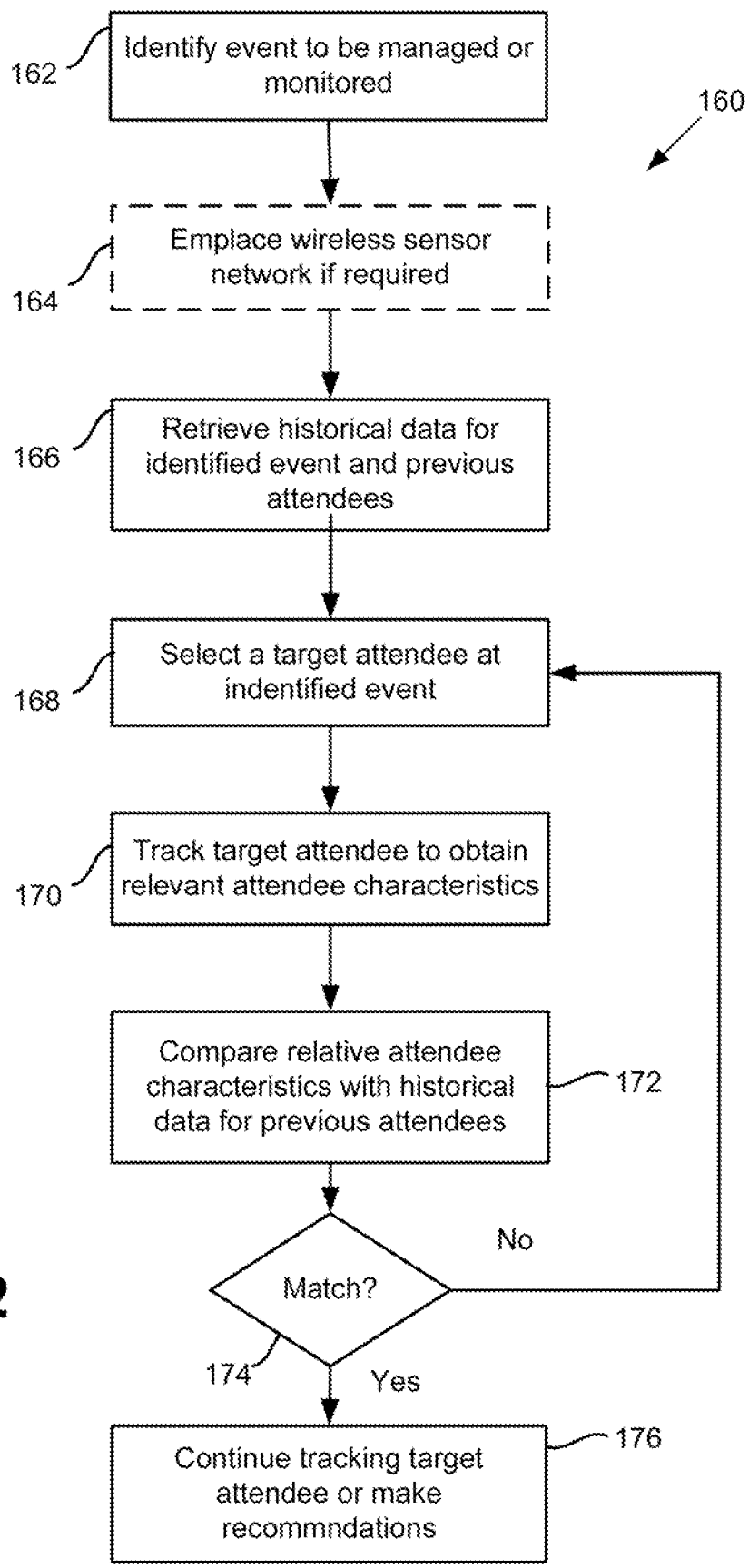
FIG. 2 is a flow diagram illustrating operation of the system of FIG. 1.

In some embodiments, the illustrated computer system may implement any of the methods described above, such as the methods illustrated by the flowchart of FIG. 2. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above.

In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments.

These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method suitable for conducting an event-based tracking of a target person attending a current event by detection, said method comprising the steps of:
generating and storing a historical profile of the target person based on one or more attributes of the target person and behavior of the target person as a participant in past events similar to the current event;
generating and storing historical profiles of locations traversed by the target person during said past events;
generating and storing historical profiles of peers with whom the target person interacted during said past events;
generating and storing historical profiles of incidents the target person met with during said past events;
generating and storing historical profiles of ambient conditions to which the target person was exposed during said past events;
detecting and capturing current locations traversed by the target person during the current event;
detecting and capturing current peers with whom the target person interacts during the current event;
detecting and capturing current incidents met by the target person during the current event;
detecting and capturing current ambient conditions to which the target person is exposed during the current event;
comparing each of said historical profiles of locations, said historical profiles of peers, said historical profiles of incidents, said historical profiles of ambient conditions, and said historical profile of the target person against said current locations, said current peers, said current incidents, and said current ambient conditions; and
finding maximum matching results based in response to said step of comparing.

2. The method of claim 1, further comprising the step of categorizing said historical profiles of locations, said historical profiles of peers, said historical profiles of incidents, and said historical profiles of ambient conditions.

3. The method of claim 1, further comprising the step of providing recommendations in connection with tracking the target person by detection.

4. The method of claim 2, further comprising the step of tracking the efficacy of said recommendations.

5. The method of claim 1 further comprising the step of detecting changes in time in at least one of: (i) said current location, (ii) said current ambient conditions, (iii) a proximity of the target person to one or more visitors, (iv) said current incidents.

6. A method suitable for managing an event-based detection and tracking of a target person at a current event, said method comprising the steps of:
capturing one or more attributes of the current event, and of past events similar to the current event;
capturing one or more attributes of the target person participating in the current event and of people participating in said past events;
capturing one or more attributes of locations traversed by the target person in the current event and by said people participating in said past events;
capturing one or more attributes of incidents faced by the target person in the current event and by said people participating in said past events;
capturing one or more attributes of ambient conditions met by the target person in the current event and by said people participating in said past events;
generating profiles of said people participating in said past events based on said captured attributes of said current event;
categorizing said people participating in said past events based on said step of generating profiles;
generating user-defined rules for detecting and tracking said people participating in said past events based on said step of categorizing;

providing recommendations in connection with selection and implementation of one or more of said generated user-defined rules for detecting and tracking; and tracking the efficacy of said provided recommendations.

* * * * *